United States Patent
Lewis et al.

(10) Patent No.: US 7,431,086 B2
(45) Date of Patent: *Oct. 7, 2008

(54) METHODS OF SERVICING A WELLBORE WITH COMPOSITIONS COMPRISING QUATERNARY MATERIAL AND SOREL CEMENTS

(75) Inventors: Sam Lewis, Duncan, OK (US); Chris Gordon, Duncan, OK (US); Mike Szymanski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/622,356

(22) Filed: Jan. 11, 2007

(65) Prior Publication Data

US 2008/0169100 A1  Jul. 17, 2008

(51) Int. Cl.
  *E21B 33/138* (2006.01)
(52) U.S. Cl. .................... 166/293; 166/300
(58) Field of Classification Search .......... 507/240
  See application file for complete search history.

(56) References Cited

U.S. PATENT DOCUMENTS

| | | | |
|---|---|---|---|
| 3,887,009 A * | 6/1975 | Miller et al. ............... 166/292 |
| 5,213,161 A | 5/1993 | King et al. |
| 5,220,960 A | 6/1993 | Totten et al. |
| 5,281,270 A | 1/1994 | Totten et al. |
| 5,298,069 A | 3/1994 | King et al. |
| 5,330,006 A | 7/1994 | Nahm et al. |
| 5,403,822 A | 4/1995 | Mueller et al. |
| 5,913,364 A | 6/1999 | Sweatman |
| 6,167,967 B1 | 1/2001 | Sweatman |
| 6,258,757 B1 | 7/2001 | Sweatman |
| 6,561,273 B2 | 5/2003 | Brothers et al. |
| 6,592,660 B2 | 7/2003 | Nguyen et al. |
| 6,616,751 B1 * | 9/2003 | Maroy et al. ............... 106/696 |
| 6,664,215 B1 | 12/2003 | Tomlinson |
| 6,887,832 B2 | 5/2005 | Kirsner et al. |
| 7,044,222 B2 | 5/2006 | Tomlinson |
| 2003/0144153 A1 | 7/2003 | Kirsner et al. |
| 2004/0040711 A1 * | 3/2004 | Tomlinson ............... 166/292 |
| 2004/0052748 A1 * | 3/2004 | Vondruska ............... 424/70.12 |
| 2004/0147404 A1 | 7/2004 | Thaemlitz et al. |

(Continued)

OTHER PUBLICATIONS

Flex Plug Service, For Curing Lost Circulation, Improving Wellbore Pressure Containment and Drilling Ahead, by Halliburton Communications, Jul. 2005.

(Continued)

*Primary Examiner*—Zakiya W. Bates
*Assistant Examiner*—Angela M DiTrani
(74) *Attorney, Agent, or Firm*—Craig W. Roddy; Conley Rose, P.C.

(57) ABSTRACT

A method of servicing a wellbore in contact with a subterranean formation comprising viscosifying a cement composition comprising a metal oxide and a soluble salt, placing the viscosified cement composition in the wellbore, and allowing the composition to set. A method of cementing a wellbore comprising preparing a cement composition comprising magnesium oxide, a chloride or phosphate salt, and a quaternary material, placing the cementitious composition into the wellbore, and allowing the cementitious composition to set. A method of viscosifying a Sorel cement comprising contacting the cement composition with quaternary material.

23 Claims, 1 Drawing Sheet

U.S. PATENT DOCUMENTS

| | | | |
|---|---|---|---|
| 2005/0032562 | A1 | 2/2005 | Kirsner et al. |
| 2005/0032652 | A1 | 2/2005 | Kirsner et al. |
| 2005/0241828 | A1 | 11/2005 | Almond et al. |
| 2006/0122071 | A1 | 6/2006 | Reddy et al. |
| 2006/0169454 | A1 | 8/2006 | Savery et al. |
| 2007/0125534 | A1* | 6/2007 | Reddy et al. ............. 166/277 |
| 2007/0125542 | A1* | 6/2007 | Wei et al. ............. 166/308.2 |

OTHER PUBLICATIONS

Thermatek Service, Helps Meet the Challenges of Severe Lost Circulation, Near Wellbore Water Shutoffs and Plugging Operations, by Halliburton Communications, May 2005.

SPE 66553, New Low Viscosity Ester is Suitable for Drilling Fluids in Deepwater Applicationsm, by Kim Burrows, et al. Copyright 2001.

U.S. Appl. No. 11/622,357, filed Jan. 11, 2007, Compositions Comprising Quaternary Material & Sorel Cements, by Sam Lewis, et al.

U.S. Appl. No. 11/622,354, filed Jan. 11, 2007, Compositions Comprising Sorel Cements and Oil Based Fluids, by Sam Lewis, et al.

U.S. Appl. No. 11/622,348, filed Jan. 11, 2007, Methods of Servicing a Wellbore with Compositions Sorel Cements and Oil Based Fluids, by Sam Lewis, et al.

Halliburton Brochure: "Accolade High-Performance Synthethic-Based Fluids from Baroid" dated Aug. 2006.

Halliburton Brochure: "Flexplug OBM Lost-Circulation Material" dated Oct. 2005.

Halliburton Brochure: "Flexplug W Lost-Circulation Material" dated Oct. 2005.

Halliburton MSDS Sheet: R-TEK dated Feb. 6, 2004.

Halliburton MSDS Sheet: C-TEK dated Jan. 7, 2004.

Office Action from U.S. Appl. No. 11/622,348 dated Jul. 19, 2007.

Hewlett, Peter C.; "Lea's Chemistry of Cement and Concrete"; Fourth Edition; Elsevier Publishing; 1998; pp. 813-820 and cover.

Notice of Allowance dated Jan. 24, 2008 (4 pages), U.S. Appl. No. 11/622,348, filed Jan. 11, 2007.

Todd, Brad, et al., "An innovative system for complete cleanup of a drill-in fluid filter cake," SPE 86494, 2004, pp. 1-9, Society of Petroleum Engineers Inc.

Vinson, E. F., et al., "Acid removable cement system helps lost circulation in productive zones," IADC/SPE 23929, Feb. 1992, pp. 1-5, IADC/SPE Drilling Conference.

Foreign communication from a related counterpart application - International Search Report and Written Opinion, PCT/GB2007/005007, Jun. 27, 2008, 12 pages.

* cited by examiner

METHODS OF SERVICING A WELLBORE WITH COMPOSITIONS COMPRISING QUATERNARY MATERIAL AND SOREL CEMENTS

CROSS-REFERENCE TO RELATED APPLICATIONS

The subject matter of the present application is related to U.S. patent application Ser. No. 11/622,348 filed Jan. 11, 2007 and entitled "Methods of Servicing Wellbore with Compositions Comprising Sorel Cement and Oil Based Fluids," and Ser. No. 11/622,354 filed Jan. 11, 2007 and entitled "Compositions Comprising Sorel Cement and Oil Based Fluids," and Ser. No. 11/622,357 filed Jan. 11, 2007 and entitled "Compositions Comprising Quaternary Material and Sorel Cements," each of which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

1. Field of the Invention

The present disclosure generally relates to wellbore servicing fluids, and more particularly to viscosified Sorel cements and methods of using same.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. The main objectives of primary cementing operations include zonal isolation to prevent migration of fluids in the annulus, support for the casing or liner string, and protection of the casing string from corrosive formation fluids. Subsequent secondary cementing operations may also be performed. Secondary or remedial cementing operations are performed to repair primary-cementing problems or to treat conditions arising after the wellbore has been constructed.

Oil or gas residing in the subterranean formation may be recovered by driving fluid into the well using, for example, a pressure gradient that exists between the formation and the wellbore, the force of gravity, displacement of the fluid using a pump or the force of another fluid injected into the well or an adjacent well. The production of fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first may need to be plugged to prevent the loss of the fracturing fluid into the formation via those fractures.

In addition to the fracturing fluid, other fluids used in servicing a wellbore may also be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Lost circulation treatments involving various plugging materials such as walnut hulls, mica and cellophane have been used to prevent or lessen the loss of fluids from wellbores. The disadvantages of such treatments include the potential for damage to subterranean formations as a result of the inability to remove the plugging materials therefrom, and the dislodgement of the plugging materials from highly permeable zones whereby fluid losses subsequently resume. One technique for preventing lost circulation problems has been to temporarily plug voids or permeable zones with Sorel cement compositions. Sorel cement compositions typically comprise magnesium oxide and a chloride or phosphate salt which together form for example magnesium oxychloride. Sorel cements can be removed with minimal damage to subterranean zones or formations by dissolution in acids. One drawback to the use of Sorel cements is that the incorporation of additives is difficult due to the relatively low viscosity of the slurries. Accordingly, it would be desirable to develop Sorel cement compositions with improved viscosities.

BRIEF SUMMARY OF SOME OF THE PREFERRED EMBODIMENTS

Disclosed herein is a method of servicing a wellbore in contact with a subterranean formation comprising viscosifying a cement composition comprising a metal oxide and a soluble salt, placing the viscosified cement composition in the wellbore, and allowing the composition to set.

Also disclosed herein is a method of cementing a wellbore comprising preparing a cement composition comprising magnesium oxide, a chloride or phosphate salt, and a quaternary material, placing the cementitious composition into the wellbore, and allowing the cementitious composition to set.

Further disclosed herein is a method of viscosifying a Sorel cement comprising contacting the cement composition with quaternary material.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE PREFERRED EMBODIMENTS

Figure 1:
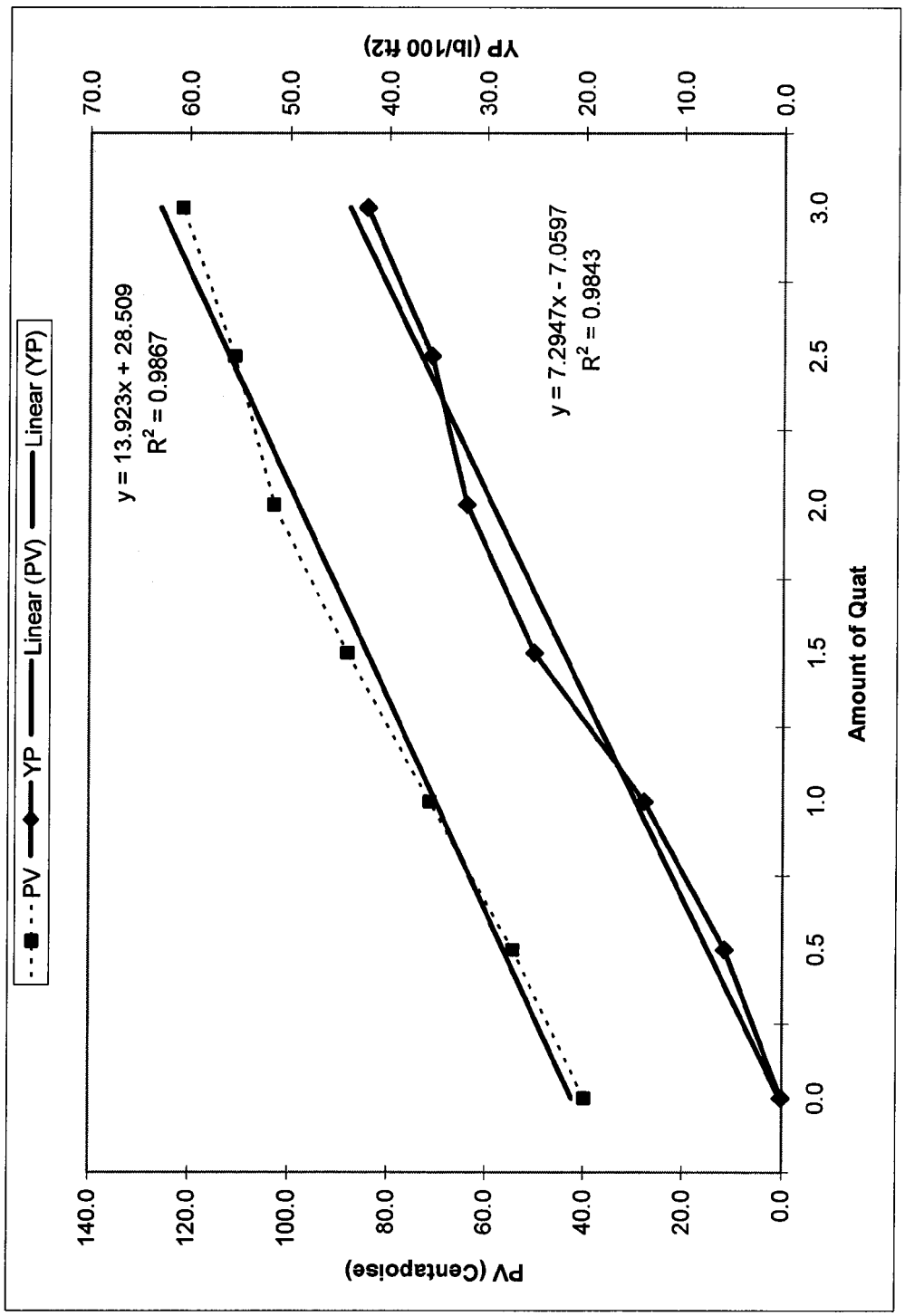
FIG. 1 is a graph of the yield point and plastic viscosity as a function of the amount of quaternary material for the samples from Example 1.

Disclosed herein are wellbore servicing fluids comprising a Sorel cement and a viscosifier and methods of using same. embodiment, the viscosifier comprises a quaternary material. Each of the components of the wellbore servicing fluid will be described in more detail later herein. Such fluids may be placed into a wellbore and allowed to set and form a rigid mass having an appreciable compressive strength. In an embodiment, the addition of a quaternary material of the type disclosed herein to a Sorel cement composition increases the viscosity of the cement composition in comparison to a Sorel cement composition lacking said quaternary material.

In various embodiments, Sorel cements comprise a metal oxide such as magnesium oxide and a soluble salt such as a chloride or phosphate salt. Magnesium oxychloride or Sorel cement is made by mixing powdered magnesium oxide (magnesia) with a concentrated solution of magnesium chloride. The principal phases formed are $Mg_3(OH)_5Cl.4H_2O$ and $Mg_2(OH)_3Cl.4H_2O$. With atmospheric $CO_2$ attack, two other phases are formed $Mg_2OHClCO_3.H_2O$ and $Mg_5(OH)_2(CO_3)_4.4H_2O$. Dissolution of MgO in the $MgCl_2$ solution leads to formation of a gel (setting) and occurs before the crystallisation of the other hydrates takes place. Sorel cements have, for a given porosity, better mechanical strengths than ordinary Portland cements. The bonding mechanism in this cement is similar to that of gypsum cement. Sorel cements also have a noteworthy adhesion to salt (sodium chloride).

The key to effective chemical reaction is the quality of the magnesia, which needs to have been produced by consistent, adequate burning. Underburning produces an excessively reactive product and overburning an insufficiently reactive material. The hydration reactions are complex and can be represented basically as follows:

$5MgO+MgCl_2+13H_2O \rightarrow 2\{Mg_3(OH)_5Cl.4H_2O$
$3MgO+MgCl_2+11H_2O \rightarrow Mg_2(OH)_3Cl.4H_2O$
$3MgO+MgCl_2+2CO_2+7H_2O \rightarrow 2\{Mg_2(OH)_3.Cl.4H_2O$
$5MgO+4CO_2+5H_2O \rightarrow Mg_5(OH)_2(CO_3)_4.4H_2O$
$Mg_3(OH)_5Cl.4H_2O+2CO_2 \rightarrow Mg_2OHClCO_3.3H_2O+ MgCO_3+3H_2O$
$MgO+MgCl_2+2MgCO_3+7H_2O \rightarrow 2Mg_2OHClCO_3.3H_2O$
$Mg_2(OH)_3Cl.4H_2O+CO_2 \rightarrow Mg_2OHClCO_3.3H_2O+2H_2O$
$MgO+4MgCO_3+5H_2O \rightarrow Mg_5(OH)_2(CO_3)_4.4H_2O$ Resistance to water depends upon the transformation of the hydroxychloride hydrates to the insoluble carbonates and can be improved by the incorporation of certain additives. These additives can be inorganic, such as phosphates, borax and calcium sulfate-silicate mixtures, or organic, such as resins, melamine urea and formaldehyde. Such additions normally cause a slowing down in compressive strength development. Sorel cements have high early strengths and can be used with many different kinds of aggregates in large quantities, such as glass fibers, wood and expanded clays.

Sorel cement has been used on occasions in the CIS, particularly with siliceous and aluminous aggregates, as a refractory oilwell cement at up to 850° C. The principal binder at 300-450° C. had been identified as a hydrated magnesium aluminosilicate having the composition $3MgO.Al_2O_3.0.5SiO_2.nH_2O$. Sorel cements are most commonly employed for industrial flooring, due to their elastic properties and resistance to accumulated static loads. Their main disadvantages are dimensional instability, poor freeze-thaw resistance and lack of resistance to atmospheric agents—they are significantly water soluble and release corrosive solutions.

There have been various developments of Sorel cements. For example, one product consists of Sorel cement with up to 10 per cent of a water-soluble ammonium salt such as ammonium chloride and sometimes also similar quantities of an aminoplast. These additives are included to give the Sorel cement better resistance against magnesium sulfate present in the inflow of water or brine to be sealed and also better setting priorities. Another Sorel cement product consists of a stoichiometric mixture of magnesium and calcium oxides, carbonates and sulfates, which is hydrated in chloride-containing waters. This particular cement mix is described as reacting by polymerisation to form a magnesium hydroxysulfate/chloride polyhydrate of high compressive strength. A water resisting Sorel cement was obtained by including a suitable additive containing $H_3PO_3$ to the $MgO—MgCl_2—H_2O$-fly ash system. This allowed the formation of a stable phase $5\,Mg(OH)_2.MgCl_2.8H_2O$, together with the insoluble phase $Mg_2P_2O_7$, in the hardened magnesium oxychloride matrix.

Magnesium oxysulfate cements can be produced by adding magnesium chloride solutions to calcium sulfates or calcium phosphate-sulphate mixtures. The magnesium oxysulfate cements formed can be regarded as variants of Sorel cements. The phosphates, where present, improve the rheological properties of the cement pastes and their water resistance. Alternatively, magnesium oxide can be treated with sulfuric acid to form magnesium oxysulfate cements. The following phases have been identified in the tatter instance depending upon the temperature and pressure conditions.

$3Mg(OH)_2.MgSO_4.8H_2O$
$5Mg(OH)_2.MgSO_4.3H_2O$
$Mg(OH)_2.MgSO_4.5H_2O$
$Mg(OH)_2.2MgSO_4.3H_2O$
$2Mg(OH)_2.3MgSO_4.5H_2O$
$MgSO_4.H_2O\ SO_4.3H_2O$
$3Mg(OH)_2.MgSO_4.4H_2O$

In an embodiment, the Sorel cement comprises a metal oxide, alternatively an alkaline earth metal oxide, alternatively magnesium oxide. In an embodiment, the Sorel cement comprises MgO. MgO may be prepared by calcination of $Mg(OH)_2$ as depicted in Reaction 1:

(Reaction 1)

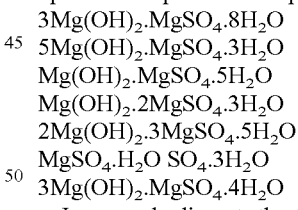

$$Mg(OH)_2 \xrightarrow{\text{heat}} MgO + H_2O$$

The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination causes the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C.-2000° C. the MgO is referred to as "dead-burned" since the majority of the reactivity has been eliminated. Dead-burned MgO has the highest degree of crystallinity of the three grades of burned MgO. An example of a dead-burned MgO includes without limitation THERMATEK™ HT additive which is commercially available from Halliburton Energy Services. A second type of MgO produced by calcining at temperatures ranging from 1000° C.-1500° C. is termed "hard-burned" and displays an intermediate crystallinity and reactivity when compared to the other two grades of burned MgO. An example of a hard-burned MgO includes without limitation THERMATEK™ LT additive which is commercially available from Halliburton Energy Services. The third grade of MgO is produced by calcining at temperatures ranging from 700° C.-1000° C. and is termed "light-burned" or "caustic" magnesia. Light-burned MgO is characterized by a high surface area, a low crystallinity and a high degree of reactivity when compared to the other grades of burned MgO. In embodiments, the MgO for use in the Sorel cement comprises hard-burned MgO, light-burned MgO, dead-burned MgO or combinations thereof.

In an embodiment, the Sorel cement comprises a soluble salt, alternatively a chloride salt, a phosphate salt or combinations thereof. In an embodiment, the Sorel cement comprises an alkaline earth metal chloride, for example magnesium chloride ($MgCl_2$) such as magnesium chloride hexahydrate, $MgCl_2.6H_2O$. $MgCl_2.6H_2O$ is well known and available from a wide variety of sources. For example, a suitable $MgCl_2.6H_2O$ for use in this disclosure is C-TEK commercially available from Halliburton Energy Services.

In an embodiment, the Sorel cement is formed through contacting MgO with $MgCl_2.6H_2O$ in the presence of other components to be described in more detail later herein. In such an embodiment, the Sorel cement may comprise MgO and $MgCl_2.6H_2O$ present in a ratio of from about 2:1 MgO:$MgCl_2.6H_2O$, alternatively from about 1.5:1 MgO:$MgCl_2.6H_2O$ and, alternatively from about 1:1 MgO:$MgCl_2.6H_2O$. Examples of Sorel cements comprising MgO (e.g., THERMATEK™ HT additive, THERMATEK™ LT additive) and $MgCl_2.6H_2O$ (e.g., C-TEK) include without limitation THERMATEK™ rigid setting fluids commercially available from Halliburton Energy Services.

In another embodiment, the Sorel cement comprises a phosphate salt. In such an embodiment, the Sorel cement may comprise MgO and a phosphate salt such as for example potassium phosphate, sodium phosphate, ammonium phosphate or combinations thereof. In such embodiments, the ratio of MgO:phosphate salt may be from about 1:4 alternatively from about 1:3, alternatively from about 1:2, alternatively from about 1:1.

In an embodiment, the Sorel cement comprises a viscosifier. Hereafter a composition comprising a Sorel cement and viscosifier will be referred to as a viscosified cement composition (VCC). The viscosifier may comprise any material compatible with the other components of the VCC and able to increase the viscosity of the VCC. Alternatively, the viscosifier comprises a quaternary amide, a quaternary amide ester or combinations thereof. In an embodiment, the viscosifier comprises an amidopropalkonium chloride with a chain length of greater than about $C_{12}$, alternatively greater than about $C_{13}$, alternatively greater than about $C_{14}$. An example of a viscosifier suitable for use in this disclosure includes without limitation stearamidopropalkonium chloride. In an embodiment, the viscosifier is present in an amount of from about 0.05 wt. % to about 5 wt. % based on the total weight of the MgO (e.g. THERMATEK™ HT, THERMATEK™ LT), alternatively from about 0.05 wt. % to about 0.5 wt. %, alternatively from about 0.05 wt. % to about 0.4 wt. %.

In an embodiment, the VCC may comprise a retarder or inhibitor. Inhibitors may be used to adjust the time required for setting of the slurry. Such inhibitors may allow the operator to control the set time of the composition based on the geothermal temperature at which the composition will be used. Increasing the weight percentage of the inhibitor will increase the time required for the composition to undergo the phase transition from a slurry to a set mass with appreciable compressive strength. Inhibitors suitable for use in this disclosure include without limitation sodium hexametaphosphate (technical grade granular), potassium magnesium phosphate hexahydrate, potassium magnesium hexametaphosphate or combinations thereof. An example of an inhibitor suitable for use in this disclosure is sodium hexametaphosphate commercially available from Deepearth Solutions under the trademark R-TEK.

In an embodiment, the thickening time of the VCC may be adjusted through the use of an inhibitor (e.g., sodium hexametaphosphate) such that the composition remains pumpable during downhole placement before rapidly setting. The thickening time refers to the time required for the cement composition to achieve 70 Bearden units of Consistency (Bc). At about 70 Bc, the slurry undergoes a conversion from a pumpable fluid state to a non-pumpable paste. Inhibitors may be present in the VCC in a range of from about 0.01% to about 10.0% by weight of the MgO (e.g. THERMATEK™ HT, THERMATEK™ LT), alternatively from about 0.1% to about 8%, alternatively from about 0.1% to about 6%.

The VCC may include a sufficient amount of water to form a pumpable slurry. The water may be fresh water or salt water, e.g., an unsaturated aqueous salt solution or a saturated aqueous salt solution such as brine or seawater. The water may be present in the amount from about 10 to about 180 percent by weight of cement (bwoc) wherein the cement comprises both the MgO and the soluble salt, alternatively from about 28 to about 60 percent by weight of cement, alternatively from about 30 to about 70 percent.

In some embodiments, additives may be included in the VCC for improving or changing the properties thereof. Examples of such additives include but are not limited to salts, accelerants, fluid loss agents, weighting materials, dispersants, vitrified shale, zeolites (or other Al—Si), formation conditioning agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art.

The components of the VCC may be combined using any mixing device compatible with the composition as known to one of ordinary skill in the art, for example a batch mixer or recirculating mixer.

The VCC may be placed into a wellbore as a single stream and activated by downhole conditions to form a set rigid mass. In such an embodiment, the VCC may be placed downhole through the drill bit forming a composition that substantially eliminates the lost circulation. In yet another embodiment, the VCC is formed downhole by the mixing of a first stream comprising one or more VCC components such as for example MgO and chloride or phosphate salt and a second stream comprising additional VCC components. Alternatively, the VCC may be formed downhole by the mixing of a first stream comprising MgO and a second stream comprising the chloride or phosphate salt, quaternary material and optional additives. Methods for introducing compositions into a wellbore to seal subterranean zones are described in U.S. Pat. Nos. 5,913,364; 6,167,967; and 6,258,757, each of which is incorporated by reference herein in its entirety.

The VCCs of this disclosure may display expanded and improved utility as wellbore servicing fluids due to their increased viscosity. Such fluids may be capable of readily suspending modifying additives that result in improvements in mechanical properties such as for example compressive strength, density and tensile strength. Furthermore, a VCC comprising a Sorel cement (e.g. THERMATEK™ rigid setting fluid) and a viscosifier of the type disclosed herein may have an increased compatibility with oleaginous fluids such as for example oil-based muds or synthetic based muds further expanding the potential utility and application of these compositions.

The VCCs of this disclosure may develop an appreciable compressive strength when placed downhole. Herein the compressive strength is defined as the capacity of a material to withstand axially directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a cement formation attains is a function of both the cement maturity (or cure time) and the temperature at which setting occurs. The cement maturity specifically refers to the time the cement formulation is allowed to set.

In an embodiment, the VCC may develop a compressive strength of from about 50 psi to about 20,000 psi, alternatively from about 100 psi to about 10,000 psi, alternatively from about 1000 psi to about 10,000 psi. The compressive strength of the VCC may develop in from about 15 minutes to equal to or greater than about 24 hours, alternatively from about 20 minutes to about 10 hours, alternatively from about 30 minutes to about 8 hours.

In some instances, the VCC may further comprise an oleaginous fluid. In an embodiment, an oleaginous fluid may be present in the VCC in an amount of from about 5% to about 100% by weight of cement (bwoc) wherein the cement comprises both the MgO and the soluble salt (e.g., THERMATEK™ rigid setting fluid), alternatively from about 5% to about 80% bwoc, alternatively from about 5% to about 50% bwoc, alternatively less than about 50% bwoc. As will be understood by one of ordinary skill in the art, the compressive strength that such a composition develops is directly proportional to the amount of oleaginous fluid present in the VCC. For example, increasing the amount of oleaginous fluid present in the VCC will decrease the final compressive strength of the set composition. Consequently, the compressive strength of a VCC further comprising an oleaginous fluid may be adjusted by varying the ratio of oleaginous fluid to VCC. Such adjustments may be made by one of ordinary skill in the art.

The VCCs of this disclosure may have a density from about 4 lb/gallon (ppg) to about 25 ppg, alternatively from about 12 ppg to about 17 ppg, alternatively from about 6 ppg to about 14 ppg. Density reducing additives such as glass beads or foam and expanding additives such as gas, suspension aids, defoamers and the like may be included in the VCC to generate a lightweight cement slurry. Amounts of such density-reducing additives and methods for their inclusion are known to one of ordinary skill in the art.

The VCCs of this disclosure exhibit a relatively constant viscosity for a period of time after they are initially prepared and while they are being placed in their intended locations in the wellbore, i.e., during the period when the slurry is in motion. Eventually, the cement compositions quickly set such that the viscosity increases from about 35 Bc to equal to or higher than 70 Bc in equal to or less than about 60 minutes, alternatively equal to or less than about 50 minutes, alternatively equal to or less than about 40 minutes, alternatively equal to or less than about 30 minutes, alternatively equal to or less than about 20 minutes, alternatively equal to or less than about 10 minutes, alternatively equal to or less than about 1 minute. This sudden jump in viscosity may be very desirable in preventing unwanted events such as gas or water migration into the slurry because it indicates the quick formation of impermeable mass from a gelled state after placement. This behavior is often referred to as "Right Angle Set" and such cement compositions are called "Right Angle Set Cement Compositions" in reference to the near right angle increase shown in a plot of viscosity as a function of time.

In embodiments wherein the VCC further comprises an oleaginous fluid, the presence of an oleaginous fluid may result in the loss of right angle set.

The VCCs of this disclosure may display a different rheology than similar compositions lacking a viscosifier. Rheology refers to the deformation and flow of matter under the influence of an applied stress. In an embodiment, the VCC is viscoelastic. Viscoelastic refers to a time-dependent property in which a material under stress produces both a viscous and an elastic response. A viscoelastic material will exhibit viscous flow under constant stress, but a portion of mechanical energy is conserved and recovered after stress is released. The viscoelastic nature of the VCC may be characterized in part by the ability of the VCC to creep when agitated generally referred to as the Weissenberg effect. Specifically, the Weissenberg effect is the tendency of some viscoelastic fluids to flow in a direction normal to the direction of shear. The effect is manifested by behavior such as the climbing of a fluid up a rotating rod.

In an embodiment, the VCC comprising a Sorel cement (e.g. THERMATEK™ rigid setting fluid) and a viscosifier has an increased plastic viscosity (PV) and yield point (YP) when compared to a Sorel cement lacking a viscosifier. The plastic viscosity is an absolute flow property indicating the flow resistance of certain types of fluids and is a measure of shearing stress while the yield point refers to the resistance of the drilling fluid to initial flow, or represents the stress required to start fluid movement. In an embodiment, a VCC as disclosed herein has a PV of greater than about 20, alternatively greater than about 80, alternatively greater than about 100 and a YP of greater than about 1, alternatively greater than about 20, alternatively greater than about 40. In an embodiment, the relationship between the amount of viscosifier included in the VCC and the PV, YP or both is about linear.

The VCC disclosed herein may be used as a wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids include, but are not limited to cement slurries, drilling fluids or muds, spacer fluids, fracturing fluids or completion fluids, all of which are well known in the art. Without limitation, servicing the wellbore includes positioning the VCC in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

In an embodiment, the VCC may be introduced to the wellbore to prevent the loss of aqueous or non-aqueous drilling fluids into loss-circulation zones such as voids, vugular zones, and natural or induced fractures while drilling. The VCC may form a non-flowing, intact mass inside the loss-circulation zone which plugs the zone and inhibits loss of subsequently pumped drilling fluid, which allows for further drilling. For example, the VCC may function as a plug that is placed into an annulus of the wellbore and prepares the formation for placement of a second (e.g. cementitious) composition.

Alternatively, the VCC when placed in a wellbore may be allowed to set such that it isolates the subterranean formation from a different portion of the wellbore, for example during primary cementing. The VCC thus forms a barrier that prevents fluids in that subterranean formation from migrating into other subterranean formations. In an embodiment, the wellbore in which the composition is positioned belongs to a multilateral wellbore configuration. It is to be understood that a multilateral wellbore configuration includes at least two principal wellbores connected by one or more ancillary wellbores.

In an embodiment, the VCC may serve as a gravel packing fluid in gravel-packing operations. Herein gravel packing refers to a method commonly utilized to prevent migration of sand into wells and to maintain the integrity of subterranean formations. In gravel packing, a permeable screen is placed against the face of a subterranean formation, followed by packing gravel against the exterior of the screen. The size of the gravel particles used for this purpose are larger than the sand particles but are also small enough to ensure that sand cannot pass through voids between the particles. The gravel is typically carried to the subterranean formation by suspending the gravel in a so-called gravel packing fluid and pumping the fluid to the formation. The screen blocks the passage of the gravel but not the fluid into the subterranean formation such that the screen prevents the gravel from being circulated out of the hole, which leaves it in place. The gravel is separated from the fluid as the fluid flows through the screen leaving it deposited on the exterior of the screen.

In an embodiment, the VCC may be used for plug and abandonment of a well, i.e. to prepare a well to be shut in and permanently isolated. A series of plugs comprising the VCC may be set in the wellbore and tested at each stage for hydraulic isolation.

EXAMPLES

The invention having been generally described, the following examples are given as particular embodiments of the invention and to demonstrate the practice and advantages thereof. It is understood that the examples are given by way of illustration and are not intended to limit the specification or the claims in any manner.

Example 1

The effect of a quaternary material on the viscosity of a Sorel cement was investigated. Specifically, the Sorel cement was THERMATEK™ rigid setting fluid which is a mixture of MgO and $MgCl_2.6H_2O$ commercially available from Halliburton Energy Services. The THERMATEK™ rigid setting fluid slurry was prepared as follows: in a Waring blender; 450 grams of C-TEK was dissolved in 300 grams of water; 450 grams of THERMATEK™ LT was added to the C-TEK solution to prepare the slurry. To the THERMATEK™ rigid setting fluid slurry was added the indicated amounts of quaternary material using a stock solution of AMMONXY SDBC which is a quaternary amidopropalkonium chloride commercially available from Stepan. The concentration of the stock solution was 60%. At room temperature, the rheological properties of the fluid were measured using a FANN 35 viscometer at 3, 6, 100, 200, 300, and 600 RPM. The viscosity at each mixing speed, plastic viscosity (centipoise) and yield point (lbs/100 $ft^2$) of the resultant slurries was measured in accordance with API Recommended Practices 10B, Bingham Plastic Model and are given in Table 1.

TABLE 1

| Slurry | RPM | | | | | | Rheology | |
|---|---|---|---|---|---|---|---|---|
| | 600 | 300 | 200 | 100 | 6 | 3 | PV | YP |
| THERMATEK ™ | 80 | 40 | 27 | 13 | 1 | 0.5 | 40 | 0 |
| +0.5 ml Quat* | 110 | 64 | 47 | 29 | 2 | 0.5 | 54 | 6 |
| +1.0 ml Quat* | 146 | 93 | 74 | 50 | 3 | 1.5 | 71 | 14 |
| +1.5 ml Quat* | 185 | 124 | 102 | 73 | 9 | 5 | 88 | 25 |
| +2.0 ml Quat* | 215 | 151 | 127 | 89 | 9 | 5 | 103 | 32 |
| +2.5 ml Quat* | 234 | 164 | 136 | 93 | 15 | 8 | 111 | 36 |
| +3.0 ml Quat* | 260 | 183 | 147 | 106 | 22 | 11 | 121 | 42 |

Quat* = quaternary material =

A graph of the yield point and plastic viscosity as a function of the amount of quaternary material is shown in FIG. 1. The results demonstrate that the addition of quaternary material to THERMATEK™ rigid setting fluid results in an increased plastic viscosity and yield point. Furthermore, within the concentration range investigated the addition of increasing amounts of quaternary material results in a linear increase in both the plastic viscosity and yield point.

Example 2

The effect of the addition of quaternary material on the compatibility of THERMATEK™ rigid setting fluid and oil-based muds was investigated. A THERMATEK™ rigid setting fluid slurry was prepared as follows: in a Waring blender; 450 grams of C-TEK was dissolved in 300 grams of water; 450 grams of THERMATEK™ LT was added to the C-TEK solution to prepare the slurry. To the THERMATEK™ rigid setting fluid slurry was added 5 ml of a 83% solution of ARQUAD 83E which is a quaternary amine commercially available from Stepan. To this mixture of THERMATEK™ rigid setting fluid and quaternary material was added the indicated amount of PETROFREE LV which is a synthetic mud commercially available from Halliburton Energy Services. At room temperature, the Theological properties of the fluid was measured using a FANN 35 viscometer at 3, 6, 100, 200, 300, and 600 RPM and allowed to set at room temperature for 24 hours and the compressive strengths of the set compositions determined. The viscosity at each mixing speed, plastic viscosity (centipoise) and yield point (lbs/100 ft$^2$) of the resultant slurries was measured in accordance with API Recommended Practices 10B, Bingham Plastic Model and are given in Table 2.

TABLE 2

| Slurry Composition | RPM | | | | | | Rheology | | Comments |
|---|---|---|---|---|---|---|---|---|---|
| | 600 | 300 | 200 | 100 | 6 | 3 | PV | YP | |
| THERMATEK ™ + Quat* | 80 | 42 | 29 | 15 | 1.5 | 0.5 | 40 | 1 | set at ~9000 psi |
| 25% mud | 118 | 65 | 45 | 25 | 3 | 2 | 58 | 4 | set at ~4000 psi |
| 50% mud | 245 | 133 | 91 | 50 | 6 | 4 | 121 | 7 | set at ~400 psi |
| 75% mud | 300+ | 300+ | 222 | 135 | 19 | 13 | 320 | 16 | thickened, not set |
| 100% mud | 300+ | 300+ | 258 | 145 | 18 | 12 | 375 | 12 | thickened, not set |

Quat* = quaternary material =

The results demonstrate an increasing viscosity, plastic viscosity and yield point with the addition of quaternary material to THERMATEK™ rigid setting fluid. Furthermore, the THERMATEK™ rigid setting fluid and quaternary material formed a set mass with appreciable compressive strength when the slurry was combined with 50% or less of oil-based mud. Similar experiments conducted using PETROFREE LV organic carrier fluid, which is an organic ester-based fluid, ACCOLADE which is an olefin/ester blend both of which are commercially available from Halliburton Energy Services or diesel which is widely commercially available as the mud also formed a set mass with appreciable compressive strength when the slurry was combined with 50% or less of the mud.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in contact with a subterranean formation comprising:

viscosifying a cement composition comprising a metal oxide, a soluble salt, and water;

placing the viscosified cement composition in the wellbore; and allowing the composition to set wherein viscosifying the cement composition comprises contacting the cement composition with a quaternary material and wherein the viscosified cement composition displays viscoelastic behavior.

2. The method of claim 1 wherein the quaternary material comprises a quaternary amide, a quaternary amide ester or combinations thereof.

3. The method of claim 1 wherein the quaternary material comprises an amidopropalkonium chloride with a chain length of greater than about $C_{12}$.

4. The method of claim 1 wherein the quaternary material is present in an amount of from 0.05% to about 5% based on the total weight of the composition.

5. The method of claim 1 wherein the viscosified cement composition has a plastic viscosity of greater than about 20.

6. The method of claim 1 wherein the viscosified cement composition has a yield point of greater than about 1.

7. The method of claim 1 wherein viscosifying the cement composition creates a composition whose yield point as a function of the amount of quaternary material is about linear.

8. The method of claim 1 wherein viscosifying the cement composition creates a composition whose plastic viscosity as a function of the amount of quaternary material is about linear.

9. The method of claim 1 wherein the viscosified cement composition displays a right angle set.

10. The method of claim 1 wherein the set viscosified cement composition has a compressive strength of from about 50 psi to about 20,000 psi.

11. The method of claim 1 wherein the viscosified cement composition has a density of from about 4 ppg to about 25 ppg.

12. The method of claim 1 further comprising contacting the cement composition with an oleaginous fluid.

13. The method of claim 12 wherein the oleaginous fluid is present in an amount of from about 5% to about 100% by weight of cement.

14. The method of claim 1 wherein the metal oxide comprises an alkaline earth metal oxide.

15. The method of claim 14 wherein the alkaline earth metal oxide comprises magnesium oxide.

16. The method of claim 1 wherein the soluble salt comprises magnesium chloride, sodium phosphate, potassium phosphate, ammonium phosphate or combinations thereof.

17. The method of claim 1 wherein the cement composition further comprises a retarder.

18. The method of claim 1 wherein the method of servicing a wellbore comprises treating lost circulation, isolating a gravel pack, supporting a conduit, plugging a void or crack in the conduit, plugging an opening between a cement sheath and a conduit, spacing fluid in front of a cement slurry, sealing an annulus or combinations thereof.

19. A method of cementing a wellbore comprising:

preparing a cement composition comprising magnesium oxide, a chloride or phosphate salt, a quaternary material, and water;

placing the cementitious composition into the wellbore; and allowing the cementitious composition to set wherein the cement composition displays viscoelastic behavior.

20. A method of viscosifying a Sorel cement comprising contacting the cement composition with quaternary material and water wherein the cement composition displays viscoelastic behavior; and placing the cement composition into the wellbore.

21. A method of servicing a wellbore in contact with a subterranean formation comprising:

viscosifying a cement composition comprising a metal oxide and a soluble salt;

placing the viscosified cement composition in the wellbore; and allowing the composition to set wherein viscosifying the cement composition comprises contacting the cement composition with a quaternary material; wherein the viscosified cement composition displays viscoelastic behavior and wherein the quaternary material comprises and amidopropalkonium chloride with a chain length of greater than about $C_{12}$.

22. A method of servicing a wellbore in contact with a subterranean formation comprising:

viscosifying a cement composition comprising a metal oxide, a soluble salt, and an oleaginous fluid;

placing the viscosified cement composition in the wellbore; and allowing the composition to set wherein viscosifying the cement composition comprises contacting the cement composition with a quaternary material and wherein the viscosified cement composition displays viscoelastic behavior.

23. The method of claim 22 wherein the oleaginous fluid is present in an amount of from about 5% to about 100% by weight of cement.

* * * * *